United States Patent [19]

Maier

[11] Patent Number: 5,127,660
[45] Date of Patent: Jul. 7, 1992

[54] SUPPORT MECHANISM FOR FLUID FILM SEALS

[75] Inventor: Martin D. Maier, Olean, N.Y.

[73] Assignee: Dresser-Rand Company, Corning, N.Y.

[21] Appl. No.: 681,917

[22] Filed: Apr. 8, 1991

[51] Int. Cl.⁵ .............................................. F16J 15/48
[52] U.S. Cl. ......................................... 277/27; 277/71;
277/74; 277/144; 277/173; 277/176; 277/188
A; 277/190; 277/192; 277/195
[58] Field of Search ................ 277/27, 173, 174, 176,
277/190, 188 A, 192, 198, 195, 142, 143, 144,
145, 74, 70, 71, 136, 137; 415/111, 174.1, 170.1

[56] References Cited

U.S. PATENT DOCUMENTS

| | | | |
|---|---|---|---|
| 1,020,456 | 3/1912 | Simon | 277/142 X |
| 1,288,143 | 12/1918 | Norwood | 277/144 |
| 2,456,356 | 12/1948 | Aber | 277/176 |
| 3,119,623 | 1/1964 | Shevehenko | 277/144 X |
| 3,186,724 | 6/1965 | Wheatley | 277/174 X |
| 3,305,241 | 2/1967 | Hart | 277/27 |
| 3,743,303 | 7/1973 | Pope | 277/27 |
| 4,289,264 | 9/1981 | Rawlins | 277/27 |

FOREIGN PATENT DOCUMENTS

| | | | |
|---|---|---|---|
| 444108 | 1/1949 | Italy | 277/144 |
| 594380 | 2/1978 | U.S.S.R. | 277/173 |

Primary Examiner—Allan N. Shoap
Attorney, Agent, or Firm—Richards, Medlock & Andrews

[57] ABSTRACT

Support mechanism for fluid film seals in turbo machinery is disclosed which controls the relative position of a seal with respect to a shaft by a plurality of wedge support structures that are located between the seal and surrounding seal housing at predetermined circumferential locations. Each support structure consists of a pair of wedge-like elements, one attached to the seal and the other to the housing, which are similar in geometry but positioned in reverse orientation with respect to one another. These form a slidably engaged contact surface inclined at a predetermined angle with respect to the shaft centerline. Positive lubrication is provided between the sliding surfaces by means of fluid supply holes that extend from a region of high pressure within the seal to a slot located inside the sliding face of the wedges. In response to the axial pressure differential acting across the seal, the seal assembly slides along the contact surfaces formed by the wedges and assumes a desired eccentric position with respect to the shaft. The relationship between the axial and radial motion and the corresponding radial force that the seal exerts on the shaft is controlled, in part, by the taper angle of the wedges. The location of the wedge support structures can be selected to either increase or decrease the static load of the shaft at the support bearings.

17 Claims, 3 Drawing Sheets

SUPPORT MECHANISM FOR FLUID FILM SEALS

TECHNICAL FIELD OF THE INVENTION

This invention relates generally to fluid film seals for use in turbo machines or the like. More particularly, but not by way of limitation, this invention relates to a support mechanism for floating fluid film seals which controls the relative position of the seal with respect to the shaft of the machine.

BACKGROUND OF THE INVENTION

It is well known that floating fluid film seals "lockup" under pressure in an eccentric position with respect to the associated shaft. A problem exists because of the uncertainty associated with the position at which floating fluid film seals "lockup". Since the eccentricity of the seal influences both rotor stability and the location of the shaft's lateral critical speeds, the uncertainty in seal position introduces a serious problem to the designer of the machinery. Tilt pad seals have been an effective means of improving rotor stability in Dresser Rand's high pressure barrel compressors. The use of tilt pad seals in low pressure applications has not been possible up to the present time because of the insufficient pressure differentials needed to "lockup" the seal at the desired eccentricity. This invention effectively deals with these problems and permits the use of tilt pad seals in low pressure applications and also provides a consistent and predictable "seal effect" in various applications.

SUMMARY OF THE INVENTION

This invention provides support mechanism for fluid film seals in turbo machinery or the like having a housing, a shaft journaled in the housing, a cavity in the housing encircling the shaft, means for applying fluid pressure in the cavity and a fluid film seal including but not limited to an annular seal ring having a seal body and tilt pad seals located in the cavity for rotatably and sealingly receiving the shaft. The support mechanism comprises at least two wedge-like structures positioned between the seal ring of the fluid film seal and the housing. A different one of the wedge-like structures is positioned on either side of a vertical plane through the centerline of the shaft at an angle $\beta$ with respect to the vertical plane. Each wedge-like structure comprises two separate elements having slidably engaged contact surfaces inclined at an angle $\theta$ with respect to the centerline of the shaft. A pressure differential, in the axial direction, across the seal ring causes the separate elements of the two wedge-like structures to move axially and radially with respect to the shaft and move the fluid film seal to an eccentric position against the shaft to cause the fluid film seal to exert a predetermined amount of force on the shaft. In the preferred embodiment, $\beta = 45°$.

DETAILED DESCRIPTION

Figure 1:
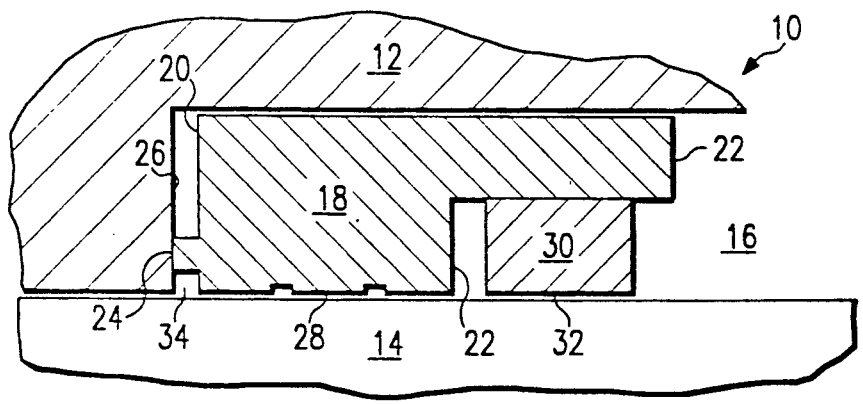
FIG. 1 is a fragmentary cross-sectional view illustrating one prior art constructed tilt pad seal assembly.

Referring to the drawing and FIG. 1 in particular, shown therein is a prior art tilt pad assembly or seal ring assembly generally designated by the reference character 10. Tilt pad seal assembly 10 is provided in a turbo machine which includes a housing 12 having bearings (not shown) that journal a rotor shaft 14. Housing 12 is hollow having a cavity 16 that is in communication with high pressure process gas introduced to the turbo machine through the inlet (not shown) thereof.

Tilt pad seal assembly 10 includes a seal body 18 having a first end 20 and a second end 22. First end 20 includes an annular seal portion 24 which engages annular surface 26 of housing 12. Seal body 18 includes a bore 28 extending therethrough that encircles rotor shaft 14 in a rotating and sealing relationship. Tilt pad assembly 10 also includes a predetermined number of tilt pads 30 operatively connected to seal body 18 by conventional means and each having a curved inner surface 32 positioned in a rotating relationship with rotor shaft 14. Tilt pads 30 are movable relative to seal body 18.

Figure 2:
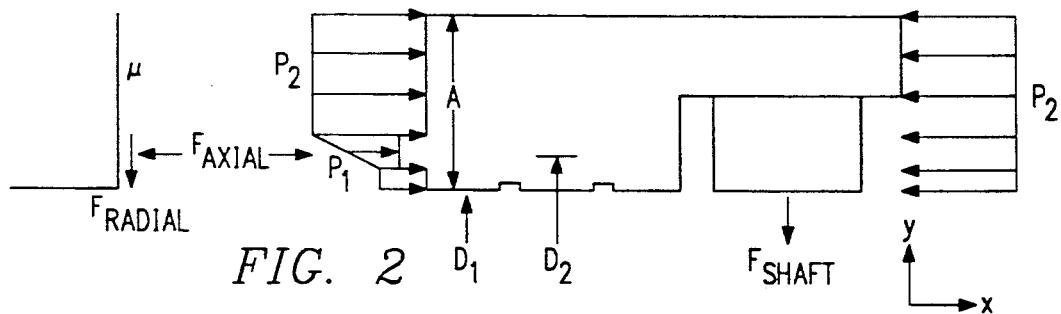
FIG. 2 is a simplified depiction of the forces and parameters to which the prior art constructed tilt pad seal assembly is subjected.

With reference to FIGS. 1 and 2, tilt pad seal assembly 10 is pressed up against annular surface 26 of housing 12 by the axial pressure differential acting across the ends of the seal assembly 10 due to the high pressure $P_2$ in cavity 16 and the lower pressure $P_1$ in cavity 34. The radial restraining force ($F_{radial}$) at the interface of the seal assembly 10 and annular surface 26 of housing 12 is equal to the net axial force ($F_{axial}$) that the seal assembly 10 exerts on the housing (termed "axial end load") multiplied by the coefficient of friction associated with the mating surfaces. Forces from the rotating rotor shaft 14 applied to seal assembly 10 move the seal assembly 10 in a radial direction such that it is no longer fully eccentric with rotor shaft 14. The radial restraining force ($F_{raidal}$) corresponds to the force that the rotor shaft 14 needs to exert on seal assembly 10 to cause seal assembly 10 to move to a different eccentric position with respect to the shaft. When the force that the shaft 14 exerts on seal assembly 10 is insufficient to move the seal assembly 10 to a different eccentric position, seal assembly 10 is said to be "locked up". The desired eccentricity at which the seal assembly 10 "locks up" is a function of the particular application.

With further reference to FIG. 2, the force balance equation of FIG. 2 defines the force ($F_{raidal} = F_{shaft}$) which determines the amount of eccentricity that the seal assembly 10 can assume with respect to rotor shaft 14. The actual eccentric position of seal assembly 10 can be anywhere between zero eccentricity ratio and a maximum value of one with the eccentricity ratio being greater for a greater force. The force balance equation is as follows:

$$\text{Unbalanced Area} = A = \frac{\pi}{4}(D_2{}^2 - D_1{}^2)$$

Where
A = area of surface juxtaposed to housing 12
$D_2$ = diameter of centerline of annular seal portion 24
$D_1$ = diameter of bore 28

$$\Sigma F_x = (P_1 - P_2)A + F_{axial} = 0$$

Where $F_{shaft} = (P_2 - P_1)A$ $$\Sigma F_y = F_{shaft} - F_{radial} = 0$$

Where $F_{shaft} = F_{raidal} = \mu F_{axial}$

Since the eccentricity of the seal assembly 10 influences both the stability of the rotor shaft 14 and the location of the first critical speed of the rotor shaft 14, the uncertainty of the position of seal assembly 10 poses a significant problem to the machine designer. Another problem occurs when there is an insufficient pressure differential acting across the seal assembly 10 to "lock up" the seal at the desired eccentric position.

Figure 3:
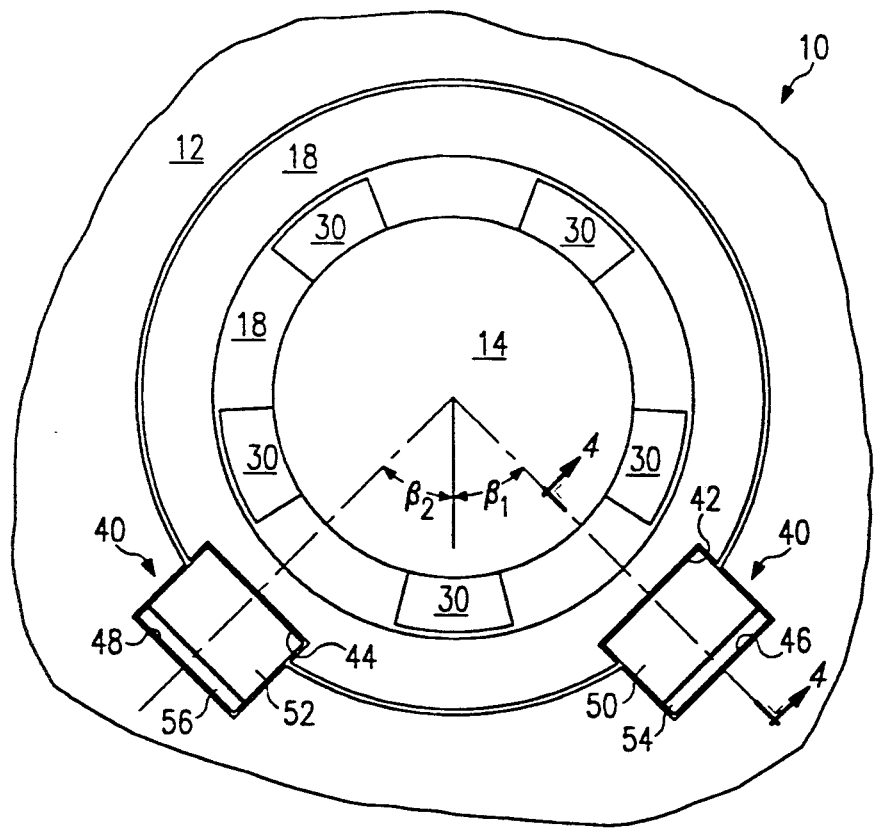
FIG. 3 is an end view, partially in section, of a tilt pad seal assembly employing the support mechanism that is constructed in accordance with the invention.

Referring to FIG. 3, shown therein and generally designated by the reference character 40 is support mechanism for tilt pad seal assembly 10 that is constructed in accordance with the invention. Support mechanism 40 comprises a first axial groove or channel 42 formed at a predetermined width and depth in the outer periphery of seal body 18. The centerline of first axial groove 42 is positioned at a predetermined angle $\beta_1$ from vertical in the lower half of seal body 18 or bottom vertical. Angle $\beta_1$ may vary from 30° to 60° but in the preferred embodiment, the angle $\beta_1$ is equal to 45° from bottom vertical. A second axial groove or channel 44 is formed at a predetermined width and depth in the outer periphery of seal body 18. The centerline of second axial groove 44 is positioned at a predetermined angle $\beta_2$ from vertical in the lower half of seal body 18 or bottom vertical. Angle $\beta_2$ may vary from 30° to 60° but in the preferred embodiment, the angle $\beta_2$ is equal to 45° from bottom vertical. Angle $\beta_1$ does not have to equal angle $\beta_2$ but in the preferred embodiment, the angles are equal. In the preferred embodiment, the centerlines of first axial groove 42 and second axial groove 44 are 90° apart.

A third axial groove or channel 46 is formed in the inner surface of housing 12 at a predetermined width and depth. The centerline of third axial groove 46 is located or positioned at the predetermined angle $\beta_1$ from bottom vertical in the lower half of housing 12. Third axial groove 46 is positioned in radial and axial alignment with first axial groove 42. A fourth axial groove 48 is formed in the inner surface of housing 12 at a predetermined width and depth. The centerline of fourth axial groove 48 is located or positioned at the predetermined angle $\beta_2$ from bottom vertical in the lower half of housing 12. Fourth axial groove 48 is positioned in radial and axial alignment with second axial groove 44.

Positioned in first axial groove 42 and attached to seal body 18 by conventional means is first seal wedge 50. Positioned in second axial groove 44 and attached to seal body 18 by conventional means is second seal wedge 52. Positioned in third axial groove 46 and attached to housing 12 by conventional means is first housing wedge 54. Positioned in fourth axial groove 48 and attached to housing 12 by conventional means is second housing wedge 56. It will be appreciated that three seal wedges could be employed and be positioned at 12 o'clock, 4 o'clock and 8 o'clock positions.

Figure 4:
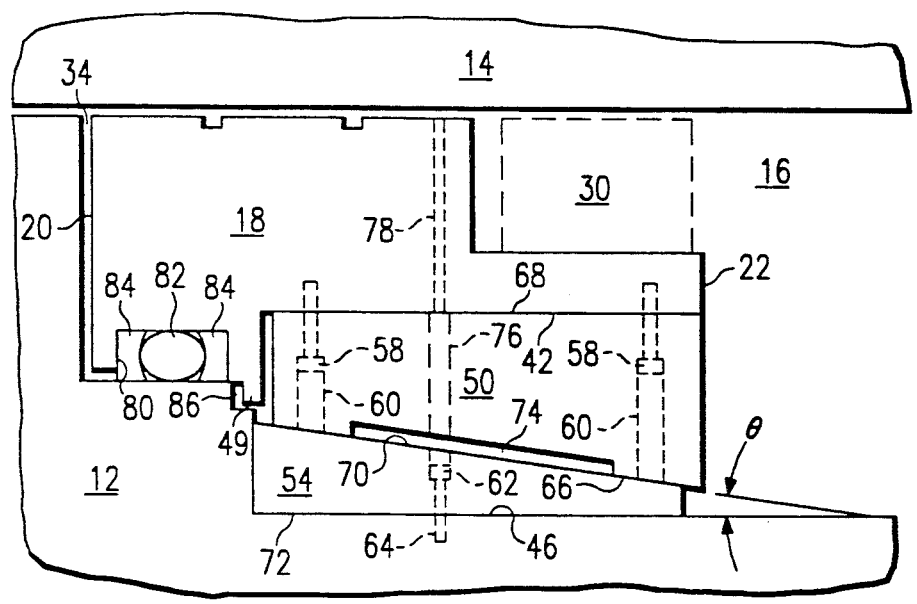
FIG. 4 is a cross-sectional view taken generally along the line 4—4 of FIG. 3.

The cross section of FIG. 4, which is taken along the line 4—4 of FIG. 3, further illustrates the structural details of one embodiment of support mechanism 40 for floating fluid film seals. Since both units of support mechanism 40 are identical, only one unit will be described in detail. First seal wedge 50 is attached to seal body 18 by conventional fastening means such as machine screws 58 inserted through bore 60. First housing wedge 54 is attached to housing 12 by conventional fastening means such as machine screws 62 inserted through bore 64.

The first or contact face 66 of first seal wedge 50 has a taper angle $\theta$ with respect to the centerline of shaft 14 and second face 68. The first or contact face 70 of first housing wedge 54 also has a taper angle $\theta$ with respect to the centerline of shaft 14 and second face 72 which is parallel to second face 68 of first seal wedge 50. The mating surfaces (first face 66 and first face 70) form an inclined ramp (at the angle $\theta$) on which first seal wedge 50 can slide or move axially with respect to housing 12 and shaft 14. Angle $\theta$ may vary from 0° to 60°. Shallow cavity 74 is machined into first or contact face 66 of first seal wedge 50 or into the first or contact face 70 of the first housing wedge 54. Passageway 76 is formed in a radial direction in first seal wedge 50 and provides fluid communication between shallow cavity 74 and second face 68. Passageway 78 is formed in a radial direction through seal body 18 and is located where the hydrodynamic pressure of the lubrication fluid in seal assembly 10 is the greatest and passageway 78 is in fluid communication with passageway 76. Passageways 76 and 78 together with cavity 74 provide positive lubrication to the mating and sliding surfaces (first face 66 and first face 70) of first seal wedge 50 and first housing wedge 54. This ensures that a low coefficient of friction is maintained between the sliding surfaces of first face 66 and first face 70.

Groove or slotted recess 80 is formed in seal body 18 and contains a resilient toroidal member 82, which is preferably an O-ring gasket which is in compressed sealing relation against housing 12 with a predetermined amount of radial crush. One or more back-up rings 84 are positioned in groove 80 alongside toroidal member 82 to prevent extrusion thereof caused by the differential pressure across and axial movement of seal assembly 10.

In operation, when the seal ring assembly 10 is subjected to a differential pressure across the ends thereof, seal body 18 and first seal wedge 50 are pushed up the inclined ramp in a radial and axial direction which forces seal body 18 together with tilt pad 30 against shaft 14. Seal body 18 is pushed up the inclined ramp until the force that the shaft 14 exerts on the seal assembly 10 through the hydrodynamic oil film balances the reaction forces associated with the seal assembly 10. Gap, opening or space 86 between housing 12 and an annular extension 49 on the outer surface of seal body 18 can be designed, if desired, to limit the axial travel of the seal assembly 10 thereby limiting the radial movement or displacement thereof. Support mechanism 40 prevents relative rotation between seal assembly 10 and housing 12.

Figure 5:
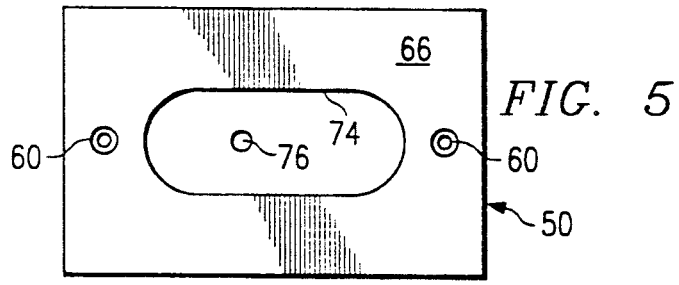
FIG. 5 is a bottom plan view of the seal ring wedge of the invention.

FIG. 5 discloses a plan view of the first or contact face 66 of first seal wedge 50. Shallow cavity 74 is generally centered in face 66 or face 70 with passageway 76 in communication therewith. During operation of the turbo machine, shallow cavity 74 is filled with lubricating oil.

Figure 6:
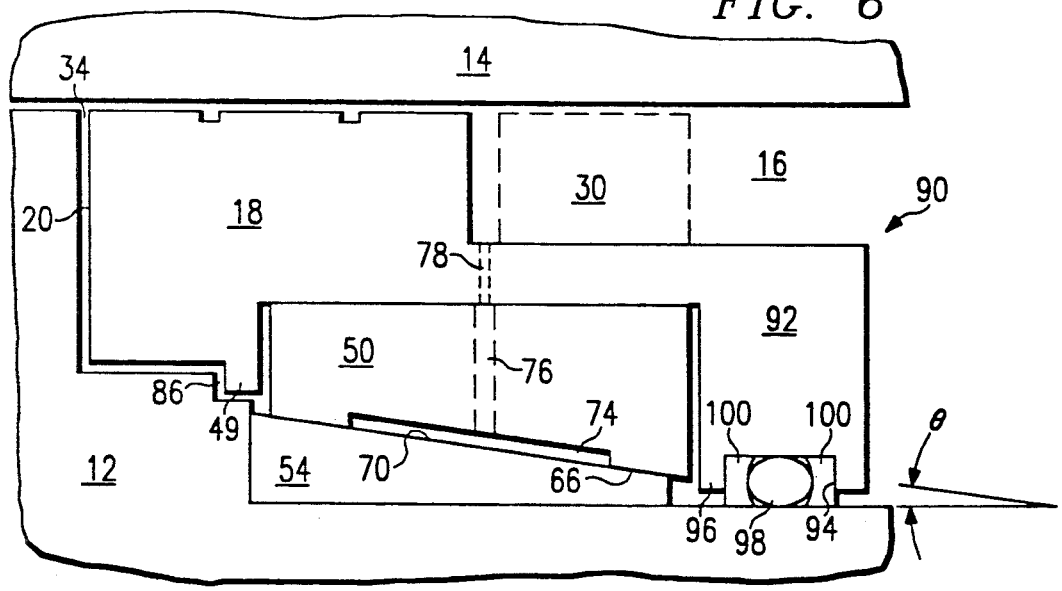
FIG. 6 is a cross-sectional view similar to FIG. 4 but illustrating another embodiment of the support mechanism constructed in accordance with the invention.

The fragmentary cross-sectional view of FIG. 6 is similar to FIG. 4 and illustrates another embodiment of a support mechanism 90 constructed in accordance with the invention. Since both units of support mechanism 90 are identical, only one unit will be described in detail. A radially projecting extension 92 has been added to second end 22 of seal body 18 which increases the axial length of the seal assembly 10. Groove or slotted recess 94 is formed in a first end 96 of radially projecting extension 92 and contains an O-ring gasket 98 which is in compressed sealing relationship against housing 12 with a predetermined amount of radial crush. One or more back-up rings 100 are positioned in groove 94 alongside O-ring gasket 98 to prevent extrusion thereof caused by the differential pressure across and axial movement of seal assembly 10.

Passageways 76 and 78 provide fluid communication between shallow cavity 74 and a region of high hydrodynamic pressure of lubricating fluid in seal assembly 10 to provide a means of positive lubrication to the mating and sliding surfaces (first face 66 and first face 70) of first seal wedge 50 and first housing wedge 54 to assure that a low coefficient of friction is maintained therebetween. First seal wedge 50 and first housing wedge 54 are attached to seal body 18 and housing 12, respectively, by conventional means as shown in FIG. 4.

The operation of the embodiment of FIG. 6 is generally the same as that of the embodiment of FIG. 4 with the differential pressure across the ends of seal assembly 10 causing seal body 18 and first seal wedge 50 to be pushed up the inclined ramp (at the angle $\theta$) which forces seal body 18 against shaft 14 to provide additional support to shaft 14 and provide additional stiffness and dampening to shaft 14. The support mechanisms 40 and 90 control the relative position of the seal assembly 10 (floating fluid film seals) with respect to shaft 14.

Figure 7:
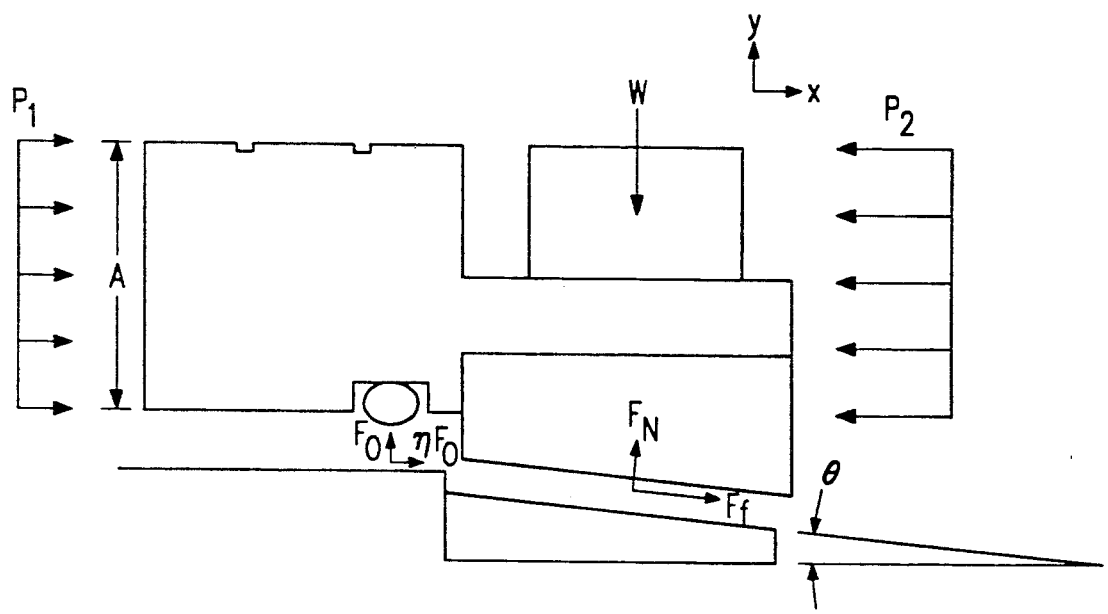
FIG. 7 is a simplified depiction of the resolution of forces at static equilibrium involving the invention.

FIG. 7 illustrates the resolution of forces acting with regard to seal assembly 10 and support mechanism 40 at the state of equilibrium. The symbols in FIG. 7 have the following meanings:

$P_1$ = low pressure
$P_2$ = high pressure
A = unbalanced area across which the differential pressure acts
$F_o$ = radial force of O-ring due to crush
W = amount of rotor weight to support
$F_N$ = normal force at wedge interface
$F_f$ = friction force at wedge interface
$\mu$ = coefficient of friction at wedge interface
$\eta$ = coefficient of friction at O-ring
$\theta$ = taper (ramp) angle
$\beta$ = wedge inclination angle The amount of weight W of rotor 14 which seal assembly 10 and support mechanism 40 can support is a function of the wedge inclination angle $\beta$, the wedge taper angle $\theta$ and the coefficient of friction $\mu$. The amount of weight W is determined by:

$$W = ((P_2 - P_1)A - \eta F_0)\left[\frac{\cos\beta\cos\theta - \mu\sin\theta}{\cos\beta\sin\theta + \mu\cos\theta}\right]$$

Figure 8:
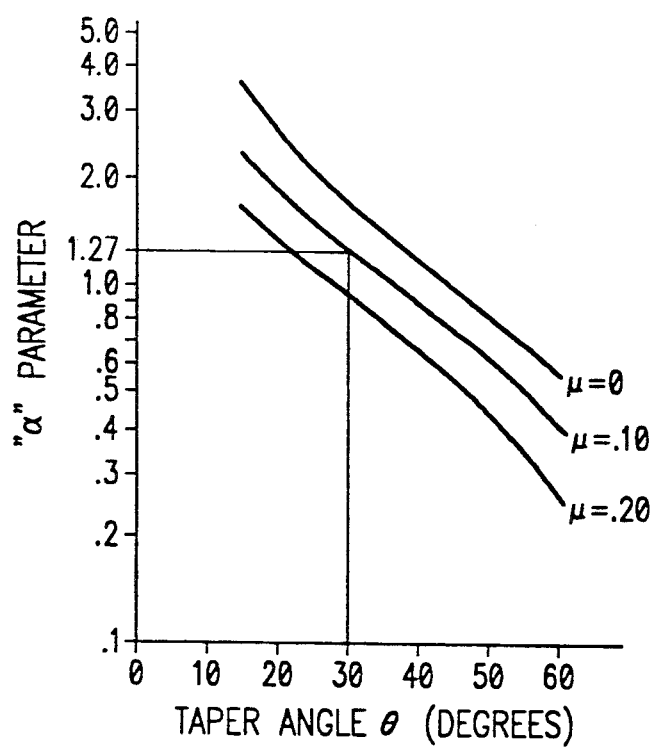
FIG. 8 is a simplified graphic representation showing the relationship between the amount of rotor weight that can be supported by the invention and the taper angle.

The above functional relationship is displayed graphically in FIG. 8 in terms of the "$\alpha$" parameter where:

$$\alpha = \frac{\cos\beta\cos\theta - \mu\sin\theta}{\cos\beta\sin\theta + \mu\cos\theta}$$

For a conventional oil film seal, "$\alpha$" is 0.10 assuming a coefficient of friction of 0.10. For the present invention, with $\beta$ equal to 45°, "$\alpha$" parameters of 1.0, 2.0, 3.0, etc. can be achieved for taper (ramp) angles $\theta$ of 30°. For example, with a taper (ramp) angle $\theta$ of 30° and a $\mu$ equals 0.10, $\alpha$ equals 1.27. Therefore, large radial seal loads can be attained for low differential pressures by selecting the appropriate taper (ramp) angle $\theta$. The particular application and the design criteria set limits on the taper (ramp) angle $\theta$ and the maximum loading of the tilt pads 30 and wedges 50, 52, 54 and 56.

If the wedge inclination angle $\beta$ is set at 45°, seal assembly 10 is adequately supported in both the vertical and horizontal directions. It would require one G of lateral rotor vibration force to off-load the wedge support mechanism 40. The level of shaft vibration corresponding to one G of dynamic force will not occur during normal periods of continuous machine operation.

To improve rotor stability in machines that have lightly loaded sleeve bearings, the wedge inclination angle $\beta$ can be set between 90° and 180° with respect to the bottom vertical. In this configuration, the seals would exert a net force downward on the shaft which would increase the eccentricity of the shaft with respect to the bearing and thereby increase rotor-bearing stability. This would also serve to raise the first critical speed which may be advantageous if the first critical speed needs to be raised out of the operating speed range.

To illustrate the invention, a sample problem has been worked involving a commercial machine—Model 4M10 available from Dresser-Rand Company, Olean, New York.

Seal ring D2 = 8.8125 inches
Seal ring D1 = 7.0 inches $$\text{Unbalanced Area } A = \frac{\pi}{4}(D2^2 - D1^2) = 22.5 \text{ in}^2$$

Sealing pressure $P_2$ = 65 psia
Atmospheric pressure $P_1$ = 15 psia $\Big\}\Delta P = 50$ psi Coefficient of friction at wedge interface $\mu$ = 0.10
Coefficient of friction at O-ring $\eta$ = 0.10
O-ring Force (EST) $F_o$ = 200 lbs
Standard Seal:
Maximum W = $\mu(P_2-P_1)A$ = 0.10(50 psi)(22.5 in$^2$) = 112 lbs
For Subject Invention:

$$W = ((P_2 - P_1)A - \eta F_0)\left(\frac{\cos\beta\cos\theta - \mu\sin\theta}{\cos\beta\sin\theta + \mu\cos\theta}\right)$$

Set $\beta$ = 45 degrees

Set $\theta = 30$ degrees $$W = ((50)(22.5) - (0.10)(200)) \left( \frac{0.612 - 0.050}{0.354 + 0.087} \right)$$

w = 1409 lbs

The solution to the problems shows that the maximum radial load that can be achieved with the conventional tilt pad seal is 112 lbs. This load is too low to permit the effect use of tilt pad seals for this low pressure application. By utilizing the present invention, the radial force can be increased to 1409 lbs, which corresponds to 26% of the total rotor weight, for a taper (ramp) angle $\theta$ of 30°. This radial load can be increased or decreased by varying the taper (ramp) angle $\theta$ accordingly. The use of the subject invention in this Model 4M10 commercial machine would result in greater rotor stability and a reduction in the amplification factor and midspan displacement associated with the first critical speed. The static loading of the journal bearings would also be reduced if the seal supports a fraction of the total rotor weight.

The inventive support mechanism and fluid film seals will not act as a rigid bearing. They will move once the force of the shaft overcomes the frictional restraining force as with traditional seal designs. The portion of the rotor weight that is supported is constant and is not a function of the shaft deflection or mode shape.

Although the present invention has been described with reference to a presently preferred embodiment, it will be appreciated by those skilled in the art that various modifications, alternatives, variations, etc., may be made without departing from the spirit and scope of the invention as defined in the appended claims.

I claim:

1. A support mechanism for fluid film seals in turbo machinery including a housing, a shaft journaled in the housing, a housing cavity in the housing encircling the shaft, pressure fluid means for providing fluid under pressure in the housing cavity for lubrication and sealing, and a fluid film seal including an annular seal ring having a seal body and tilt pad seals having a first end exposed to a first pressure and a second end exposed to a second and higher pressure and located in the housing cavity for rotatably and sealingly receiving the shaft, said support mechanism comprising:

a first seal wedge structure attached to the annular seal ring for movement therewith and positioned at an angle $\beta_1$ in a first direction from a vertical plane passing through the centerline of the shaft, said first seal wedge structure having a contact surface at an angle $\theta$ with the centerline of the shaft;

a first housing wedge structure attached to the housing and positioned in general radial and axial alignment with said first seal wedge structure, said first housing wedge structure having a contact surface in slidable contact with said contact surface of said first seal wedge structure;

a second seal wedge structure attached to the annular seal ring for movement therewith and positioned at an angle $\beta_2$ in a second and opposite direction from said vertical plane as that for angle $\beta_1$, said second seal wedge structure having a contact surface at an angle $\theta$ with the centerline of the shaft; and a second housing wedge structure attached to the housing and positioned in general radial and axial alignment with said second seal wedge structure, said second housing wedge structure having a contact surface in slidable contact with said contact surface of said second seal wedge structure, whereby a pressure differential across the fluid film seal causes the first and second seal wedge structures to move axially and radially with respect to the shaft to move the fluid film seal to an eccentric position relative to the shaft to cause said fluid film seal to exert a predetermined amount of force on the shaft.

2. The support mechanism of claim 1 further including a lubrication cavity formed in said contact surface of said first seal wedge structure.

3. The support mechanism of claim 2 further including fluid conduit means extending from said lubrication cavity through said first seal wedge structure and said annular seal ring to a location at the sealing face of said annular seal ring where the hydrodynamic pressure of the fluid at the sealing face of the annular seal ring is greater than the static pressure at the contact surface of said first seal wedge structure to provide positive lubrication to the contact surface of said first seal wedge structure.

4. The support mechanism of claim 2 further including fluid conduit means extending from said lubrication cavity through said first seal wedge structure and said annular seal ring to the high pressure side of the fluid film seal such that the hydrostatic pressure of the fluid provides lubrication to the contact surface of said first seal wedge structure.

5. The support mechanism of claim 1 further including a lubrication cavity formed in said contact surface of said second seal wedge structure.

6. The support mechanism of claim 5 further including fluid conduit means extending from said lubrication cavity through said second seal wedge structure and said annular seal ring to a location at the sealing face of said annular seal ring where the hydrodynamic pressure of the fluid at the sealing face of the annular seal ring is greater than the static pressure at the contact surface of said second seal wedge structure to provide positive lubrication to the contact surface of said second seal wedge structure.

7. The support mechanism of claim 5 further including fluid conduit means extending from said lubrication cavity through said second wedge structure and said annular seal ring to the high pressure side of the fluid film seal such that the hydrostatic pressure of the fluid provides lubrication to the contact surface of said second seal wedge structure.

8. The support mechanism of claim 1 further including an annular groove formed in the first end of the seal body exported to the first pressure and a resilient toroidal member located in said annular groove in a compressed sealing relation against the housing.

9. The support mechanism of claim 1 further including an annular groove formed in the second end of the seal body exported to the second and higher pressure and a resilient toroidal member located in said annular groove in a compressed sealing relation against the housing.

10. The support mechanism of claim 8 further including two back-up rings positioned in said annular groove formed in the first end of the seal body, a different one of the two back-up rings positioned on each side, in an axial direction, of said resilient toroidal member.

11. The support mechanism of claim 9 further including two back-up rings positioned in said annular groove formed in the second end of the seal body, a different one of the two back-up rings positioned on each side, in an axial direction, of said resilient toroidal member.

12. The support mechanism of claim 1 further including an opening of predetermined dimension, in the axial direction, formed between said annular seal ring and the housing whereby the axial travel distance of said annular seal ring is limited to a maximum distance determined by the predetermined dimension of said opening.

13. The support mechanism of claim 1 wherein angle $\beta_1$ has a value in the range of 30° to 60°.

14. The support mechanism of claim 1 wherein angle $\beta_2$ has a value in the range of 30° to 60°.

15. The support mechanism of claim 1 wherein angle $\beta_1$ has a value of 45°.

16. The support mechanism of claim 1 wherein angle $\beta_2$ has a value of 45°.

17. The support mechanism of claim 1 wherein angle $\theta$ has a value less than 30°.

* * * * *

UNITED STATES PATENT AND TRADEMARK OFFICE
CERTIFICATE OF CORRECTION

PATENT NO. : 5,127,660

DATED : July 7, 1992

INVENTOR(S) : Martin D. Maier

It is certified that error appears in the above-identified patent and that said Letters Patent is hereby corrected as shown below:

Column 3, line 12, change "shaft" to --axial--.

Column 5, line 49, change "of equilibrium" to --of static equilibrium--.

Column 6, line 15, change "of 30°" to --less than 30°--.

Column 6, line 59, change "Standard Seal:" to --For Standard Seal:--

Column 8, line 55, change "exported" to --exposed--.

Column 8, line 60, change "exported" to --exposed--.

Signed and Sealed this

Nineteenth Day of April, 1994

Attest:

BRUCE LEHMAN

Attesting Officer     Commissioner of Patents and Trademarks